Apr. 17, 1923.
H. J. LOCKHART
1,452,244
CONTROL MECHANISM FOR WELL DRILLING MACHINES
Filed Oct. 31, 1921     2 Sheets-Sheet 1
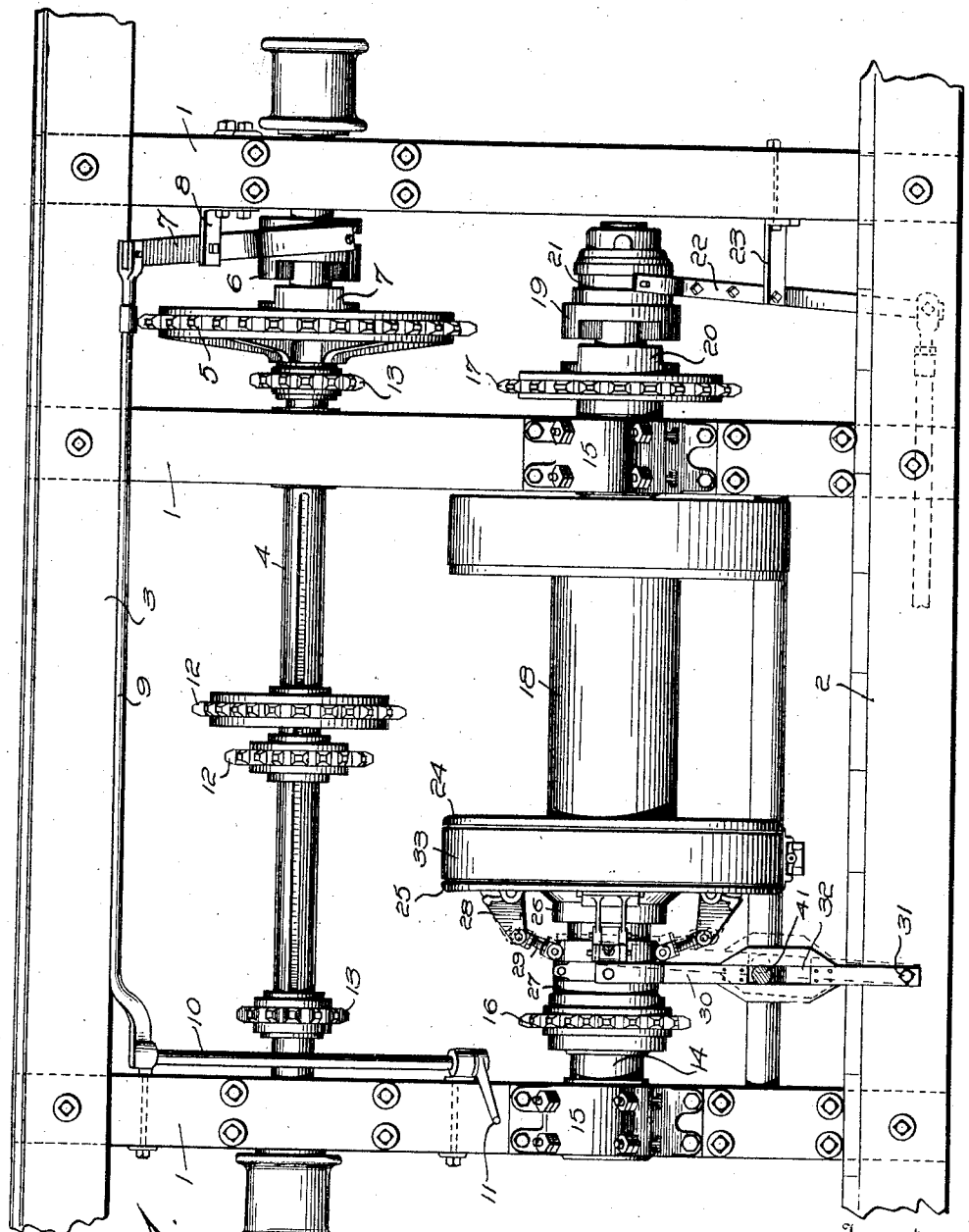
Inventor
HAROLD. J. LOCKHART
By

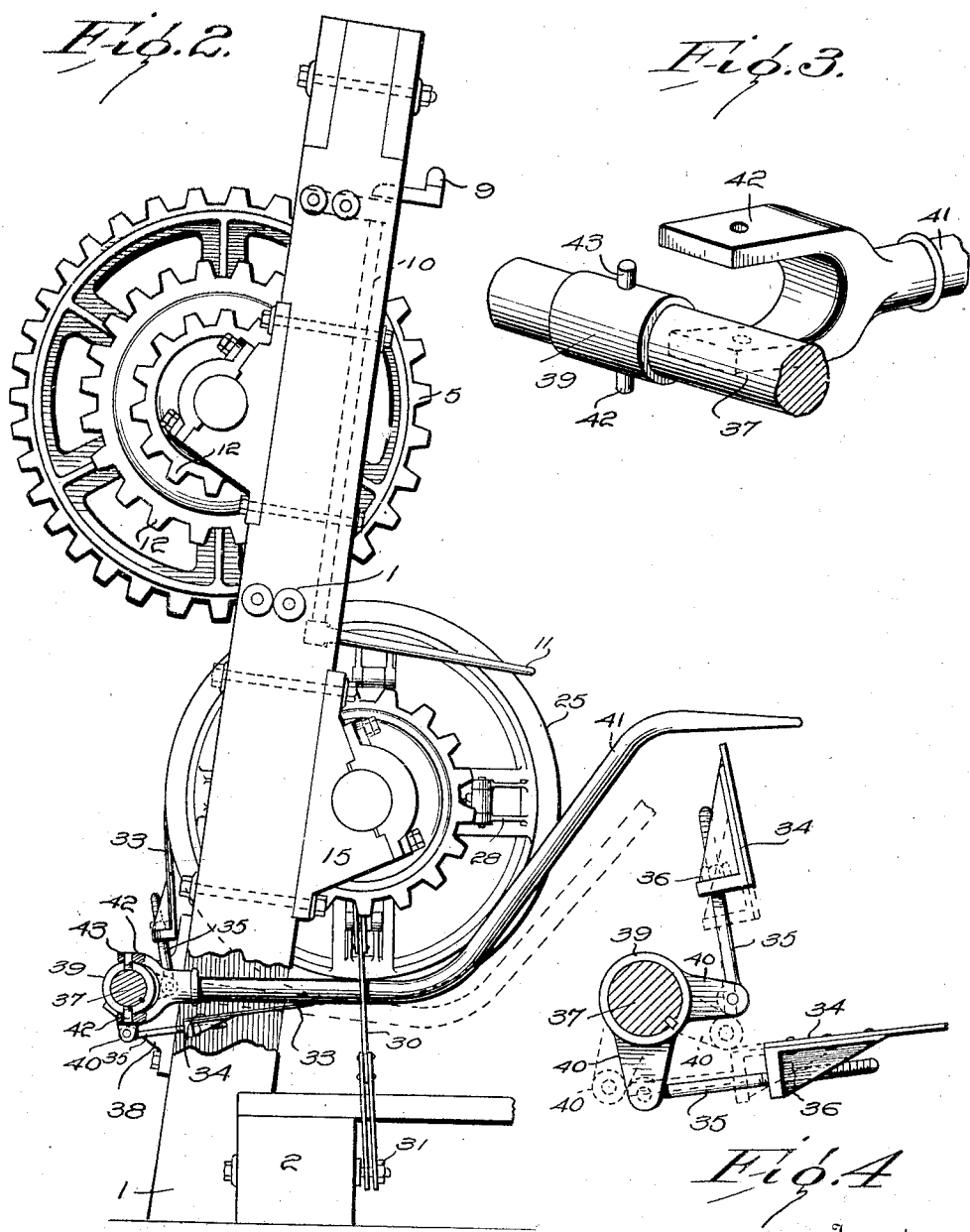

Patented Apr. 17, 1923.

1,452,244

UNITED STATES PATENT OFFICE.

HAROLD J. LOCKHART, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

CONTROL MECHANISM FOR WELL-DRILLING MACHINES.

Application filed October 31, 1921. Serial No. 511,914.

*To all whom it may concern:*

Be it known that I, HAROLD J. LOCKHART, a citizen of the United States, residing at Parkersburg, in the county of Wood and State of West Virginia, have invented certain new and useful Improvements in Control Mechanism for Well-Drilling Machines, of which the following is a specification.

This invention relates to control mechanism for well drilling machines, and more particularly to means for controlling the drum of rotary draw works.

An object of the invention is the provision of a friction clutch connecting the drum to the drive mechanism and a brake band engaging the drum, the clutch and brake being controlled by a single lever. The brake lever is mounted on a pair of pins on the brake shaft, and is adapted to be moved in one direction to revolve the shaft and apply the brake. When the brake lever is swung about the pins as an axis, the clutch control lever is moved longitudinally of the shaft to engage or disengage the clutch.

The use of a friction clutch permits the draw works to be operated while the engine is running at full speed and to start without shock. The operation of a single lever controls the raising or lowering of the tools in the least possible time.

In the accompanying drawings, I have shown one embodiment of the invention. In this showing:

Figure 1 is a side elevation of a rotary draw works showing the invention applied, Figure 2 is an end view, parts being shown in section, Figure 3 is a detail view of the brake lever, and, Figure 4 is a similar view of the brake shaft.

Referring to the drawings, the reference numeral 1 designates suitable uprights forming a part of the frame. These uprights are mounted on a base 2 and connected at the upper end by means of a cross member 3. A main shaft 4 is mounted in suitable bearings in the uprights. This shaft is provided with a cog wheel 5, over which a chain (not shown) is adapted to pass, the chain being driven by any suitable means to operate the draw works.

The sprocket is loosely mounted on the shaft and is adapted to be connected thereto by means of a clutch member 6 which engages a similar clutch member formed on the hub of the sprocket wheel. The clutch member 6 is keyed to the shaft and is controlled by a lever 7 pivotally mounted in a bracket 8, carried by one of the uprights. This lever is connected to a control member 9 having a crank 10 formed on one end thereof. The lower end of the crank is provided with a handle 11. Sprocket wheels 12 may be mounted on the main shaft to drive suitable apparatus. The main shaft is further provided with a pair of sprocket wheels 13 by means of which the drum shaft is connected to the main shaft. As shown, a drum shaft 14 is mounted in suitable bearings 15, carried by the uprights and arranged beneath the main shaft. A pair of sprockets 16 and 17 are mounted on this shaft in alinement with the sprockets 13. The number of teeth on the sprockets 16 and 17 vary to permit the drum shaft to be driven at different speeds. A drum 18 of the usual type is mounted on the drum shaft. The sprockets 16 and 17 are loosely mounted on the shaft and are adapted to be connected thereto, when desired, by means of clutches. In the drawings, I have shown the sprockets 17 connected to the shaft by means of the usual type of dental clutch now employed. As shown, a clutch member 19 is arranged on the shaft adjacent the sprocket wheel 17, this clutch member being keyed to the shaft. The hub of the sprocket wheel is provided with an engaging clutch member 20. The clutch member 19 is provided with a groove 21 for the reception of the ends of a lever 22, which is pivotally mounted in a bracket 23, carried by one of the uprights. When the clutch members 19 and 20 are in engagement, the drum shaft 14 and the drum 18 are driven from the main shaft by means of a chain (not shown) passing over the sprockets 13 and 17.

The sprocket 16 is adapted to be connected to the main shaft by a frictional clutch forming the subject matter of the present invention. The drum 18 is of the spool type having enlarged ends. The end 24 adjacent the sprocket 16 is hollow and forms one element of a friction clutch. The other element 25 is adapted to be received therein and is provided with a suitable hub 26 surrounding the shaft. A sleeve 27 is slidably mounted on the shaft and this sleeve is connected to the clutch member 25 by means of links 28. These links are provided with threaded portions 29 to permit adjustment. The clutch member is controlled by a lever 30, pivotally mounted on the base of the machine, as at 31. As shown, the lever is provided with an elongated slot 32.

A brake band 33 is arranged around the enlarged end 24 of the drum. The ends of the band are secured to substantially L-shaped members 34. The base of these members are provided with openings for the passage of rods 35. These rods are provided with threaded ends adapted to receive nuts 36. By adjusting the nuts on the rods, the tension of the brake band may be varied. A brake shaft 37 is arranged in a suitable bracket 38, carried by the frame, and this shaft is surrounded by a sleeve 39. The sleeve is provided with crank portions 40 to which the ends of the rods are secured. A brake lever 41 is adapted to control the brake. This lever is provided with a forked end, forming a pair of spaced arms 42 adapted to receive the sleeve 39. The sleeve is provided with pins 43, which are received in openings in the ends of the arms 42. The lever 41 passes through the slot in the clutch lever 30.

In operation, the sprocket wheel 16 and the associated elements forming one member of the friction clutch are loosely mounted on the shaft 14, and are driven from the sprocket wheel 13 by means of a chain (not shown.) When the clutch lever is moved from the full line position in Figure 1 of the drawings to the dotted line position, the friction clutch is engaged and the drum 18 is driven. The clutch lever is controlled by lever 41 which is swung on the pins 43 to move the clutch lever. When the machine is to be stopped, the clutch is disengaged and the clutch lever 41 then moved in a vertical plane to revolve the sleeve 39 to move the ends of the brake band 33 to the dotted line position shown in Figure 4 of the drawings, thus applying the brake.

While the clutch and brake forming the subject matter of the present invention are shown as replacing one of the usual dental clutches, it is apparent that a friction clutch may be employed in place of the clutch members 19 and 20 in a two-speed rotary draw works, as illustrated in the drawings. The dental clutch is shown in the accompanying drawings for the purpose of illustrating the present type of apparatus.

As stated, the use of a friction clutch permits the drum to be thrown in when the engine is running at full speed and gives a smoother running, eliminating the shock which results when a solid clutch is employed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a rotary draw works, a drive shaft, a drum shaft, a drum mounted thereon, a friction clutch, one element of said clutch being carried by said drum, the other element being loosely mounted on said drum shaft, means for driving said loosely mounted element from said drive shaft, a brake band arranged on said drum, and a lever controlling said brake band and said clutch.

2. In a rotary draw works, a drive shaft, a drum shaft, a drum mounted thereon, a friction clutch, one element of said clutch being carried by said drum, the other element being loosely mounted on said drum shaft, means for driving said loosely mounted element from said drive shaft, a brake band arranged on said drum, a lever controlling said brake band, and a pivotally mounted control lever connected to the loosely mounted element of said clutch, said clutch lever being provided with an elongated slot for the reception of said brake lever, whereby movement of said brake lever in one plane will actuate said clutch lever.

3. In a rotary draw works, a drive shaft, a drum shaft, a drum mounted thereon, a friction clutch, one element of said clutch being carried by said drum, the other element being loosely mounted on said drum shaft, means for driving said loosely mounted element from said drive shaft, a brake band arranged on said drum, a pivotally mounted lever connected to said loosely mounted clutch element, said pivotally mounted lever being provided with an elongated slot, and a brake lever passing through said slot, the movement of the brake lever longitudinally of the clutch lever being adapted to apply the brake, the movement of the brake lever at an angle to the clutch lever being adapted to swing said clutch lever on its pivot.

4. In a rotary draw works, a drive shaft, a drum shaft, a drum mounted thereon, a friction clutch, one element of said clutch being carried by said drum, the other element being loosely mounted on said drum shaft, means for driving said loosely mounted element from said drive shaft, a pivotally mounted clutch lever connected to the loosely mounted element of said clutch, said clutch lever being provided with an elongated slot, a brake lever passing through said slot, a brake shaft to which said lever is connected, and means for applying said brake when said brake shaft is rotated, whereby movement of said brake shaft in said slot is adapted to apply said brake and movement of said brake lever in a different plane is adapted to swing said clutch lever on its pivot to actuate said clutch.

5. In a rotary draw works, a drive shaft, a drum shaft, a drum mounted thereon, a friction clutch, one element of said clutch being carried by said drum, the other element being loosely mounted on said drum shaft, means for driving said loosely mounted element from said drive shaft, a pivotally mounted clutch lever connected to the loosely mounted element of said clutch, said clutch lever being provided with a longitudinal slot, a brake shaft, means for tightening said brake band when said shaft is rotated, a brake lever connected to said shaft to rotate it when said lever is moved in one plane, said brake lever being adapted to pass through said slot and being capable of movement in said slot to rotate said brake shaft, and connections between said shaft and said brake lever to permit movement of said lever in a different plane to swing said clutch lever on its pivot.

In testimony whereof I affix my signature in presence of two witnesses.

HAROLD J. LOCKHART.

Witnesses:
L. D. DUNSMOOR,
D. M. LONG.